(12) United States Patent
Mori

(10) Patent No.: US 9,444,359 B2
(45) Date of Patent: Sep. 13, 2016

(54) POWER CONVERSION APPARATUS WITH INDUCTION CONTROL

(71) Applicant: SAMSUNG ELECTRONICS CO., LTD., Suwon-si (KR)

(72) Inventor: Keisuke Mori, Minoo-si (JP)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 249 days.

(21) Appl. No.: 14/093,813

(22) Filed: Dec. 2, 2013

(65) Prior Publication Data

US 2014/0153300 A1 Jun. 5, 2014

(30) Foreign Application Priority Data

Dec. 4, 2012 (JP) ................. 2012-265118

(51) Int. Cl.
| | |
|---|---|
| *H02M 5/458* | (2006.01) |
| *H02M 5/42* | (2006.01) |
| *H02M 7/00* | (2006.01) |
| *H02M 1/14* | (2006.01) |
| *H02M 1/44* | (2007.01) |

(52) U.S. Cl.
CPC ............... *H02M 5/458* (2013.01); *H02M 5/42* (2013.01); *H02M 7/003* (2013.01); *H02M 1/14* (2013.01); *H02M 1/44* (2013.01)

(58) Field of Classification Search
CPC .......... H02M 1/14; H02M 1/44; H02M 5/42; H02M 5/48; H02M 7/003; H02M 7/0035
USPC ......................................................... 361/772
See application file for complete search history.

(56) References Cited

U.S. PATENT DOCUMENTS

| | | | | |
|---|---|---|---|---|
| 2002/0034089 | A1* | 3/2002 | Mori | H02M 7/003 363/147 |
| 2003/0076696 | A1* | 4/2003 | Tsai | H02J 9/062 363/37 |
| 2004/0062006 | A1* | 4/2004 | Pfeifer | F28F 3/12 361/699 |
| 2009/0296436 | A1* | 12/2009 | Ko | H02M 5/458 363/74 |
| 2012/0139483 | A1* | 6/2012 | Cottet | H01G 2/06 320/107 |

FOREIGN PATENT DOCUMENTS

| | | |
|---|---|---|
| JP | 2005-65412 | 3/2005 |
| JP | 2005-166867 | 6/2005 |

* cited by examiner

*Primary Examiner* — Fred E Finch, III
(74) *Attorney, Agent, or Firm* — Staas & Halsey LLP

(57) ABSTRACT

Disclosed is a power conversion apparatus with further reduced inductance of conductors coupling condensers. The power conversion apparatus includes a smoothing circuit having first and second electrolytic condensers connected to each other in series and third and fourth electrolytic condensers connected to each other in series. The distance between a positive terminal of the first electrolytic condenser and a negative terminal of the third electrolytic condenser is shorter than the distance between the positive terminal of the first electrolytic condenser and a positive terminal of the fourth electrolytic condenser. The distance between the positive terminal of the fourth electrolytic condenser and a negative terminal of the second electrolytic condenser is shorter than the distance between the positive terminal of the fourth electrolytic condenser and the positive terminal of the first electrolytic condenser.

7 Claims, 11 Drawing Sheets

POWER CONVERSION APPARATUS WITH INDUCTION CONTROL

CROSS-REFERENCE TO RELATED APPLICATION

This application claims the benefit of Japanese Patent Application No. 2012-0265118, filed on Dec. 4, 2012 in the Japanese Patent Office, the disclosure of which is incorporated herein by reference.

BACKGROUND

1. Field

Embodiments of the present invention relate to a power conversion apparatus including a smoothing circuit having condensers.

2. Description of the Related Art

Power conversion apparatuses that receive alternating current as input and output alternating current to supply power to load are well known. A power conversion apparatus converts the input alternating current into direct current through a rectifier and a smoothing circuit. Subsequently, the power conversion apparatus converts the direct current into alternating current through an inverter and outputs the obtained alternating current.

A conventional power conversion apparatus is disposed in, for example, Japanese Patent Application Publication No. 2010-193593.

A smoothing circuit converts pulsating current output from a rectifier into direct current. The smoothing circuit includes a plurality of electrolytic condensers. The electrolytic condensers are coupled to each other by conductors. It may be necessary to reduce inductance of the conductors.

SUMMARY

It is an aspect of the present invention to provide a power conversion apparatus with further reduced inductance of conductors coupling condensers.

Additional aspects of the invention will be set forth in part in the description which follows and, in part, will be obvious from the description, or may be learned by practice of the invention.

In accordance with an aspect of the present invention, a power conversion apparatus includes a smoothing circuit having first and second electrolytic condensers connected to each other in series and third and fourth electrolytic condensers connected to each other in series, wherein a positive terminal of the first electrolytic condenser and a positive terminal of the fourth electrolytic condenser are connected to a positive potential conductor, a negative terminal of the second electrolytic condenser and a negative terminal of the third electrolytic condenser are connected to a negative potential conductor, a negative terminal of the first electrolytic condenser and a positive terminal of the second electrolytic condenser are connected to a common potential conductor, a positive terminal of the third electrolytic condenser and a negative terminal of the fourth electrolytic condenser are connected to the common potential conductor, the distance between the positive terminal of the first electrolytic condenser and the negative terminal of the third electrolytic condenser is shorter than the distance between the positive terminal of the first electrolytic condenser and the positive terminal of the fourth electrolytic condenser, and the distance between the positive terminal of the fourth electrolytic condenser and the negative terminal of the second electrolytic condenser is shorter than the distance between the positive terminal of the fourth electrolytic condenser and the positive terminal of the first electrolytic condenser.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
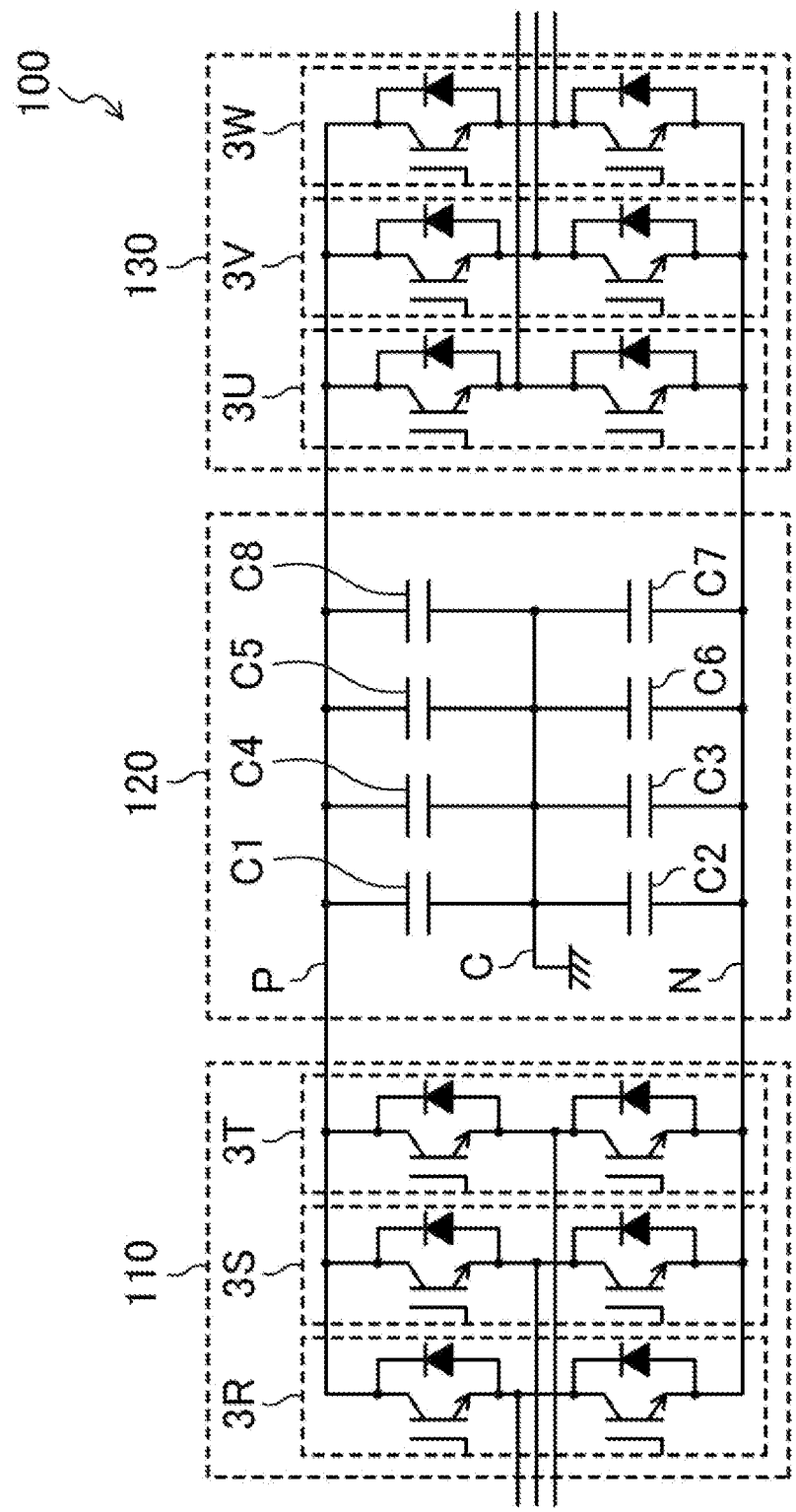
FIG. 1 is a view showing a power conversion apparatus according to an embodiment of the present invention.

Reference will now be made in detail to the embodiments of the present invention, examples of which are illustrated in the accompanying drawings, wherein like reference numerals refer to like elements throughout.

Outline of System

FIG. 1 is a view showing a power conversion apparatus 100 according to an embodiment of the present invention. The power conversion apparatus 100 includes a rectifier 110, a smoothing circuit 120, and an inverter 130. The rectifier 110 allows input of, for example, three-phase alternating current at an input node thereof. The inverter 130 outputs, for example, three-phase alternating current at an output node thereof.

The rectifier 110 includes, for example, three legs 3R, 3S, and 3T. Each of the legs 3R, 3S, and 3T includes two switching devices. Each of the switching devices is, for example, a metal-oxide semiconductor field effect transistor (MOSFET). The rectifier 110 is controlled by, for example, pulse width modulation (PWM). The rectifier 110 may be a diode bridge. The rectifier 110 may be any appropriate type rectifier. The rectifier 110 may include any appropriate number of any appropriate switching devices or rectifying devices.

The smoothing circuit 120 includes, for example, eight condensers C1 to C8. The number of condensers included in the smoothing circuit 120 is not limited to eight. The smoothing circuit 120 may include an appropriate number of condensers. Each of the condensers C1 to C8 is typically a large-capacity electrolytic condenser. The smoothing circuit 120 may include any appropriate number of any appropriate condensers.

A positive potential conductor P interconnects positive terminals of the condensers C1, C4, C5, and C8. The positive potential conductor P may be a conductive pattern included in a printed circuit board. Alternatively, the positive potential conductor P may be a bus bar (also referred to as a busbar) made of metal. A negative potential conductor N interconnects negative terminals of the condensers C2, C3, C6, and C7. The negative potential conductor N may be a conductive pattern included in the printed circuit board. Alternatively, the negative potential conductor N may be a bus bar made of metal. A common potential conductor C connects negative terminals of the condensers C1, C4, C5, and C8 to positive terminals of the condensers C2, C3, C6, and C7. The common potential conductor C may be a conductive pattern included in the printed circuit board. Alternatively, the common potential conductor C may be a bus bar made of metal.

The inverter 130 includes three legs 3U, 3V, and 3W. Each of the legs 3U, 3V, and 3W includes two switching devices. Each of the switching devices is, for example, a MOSFET. The inverter 130 may be any appropriate type inverter. The inverter 130 may include any appropriate number of any appropriate switching devices. For example, the number of switching devices included in each leg is not limited to the above-specified number but an appropriate number.

Figure 2:
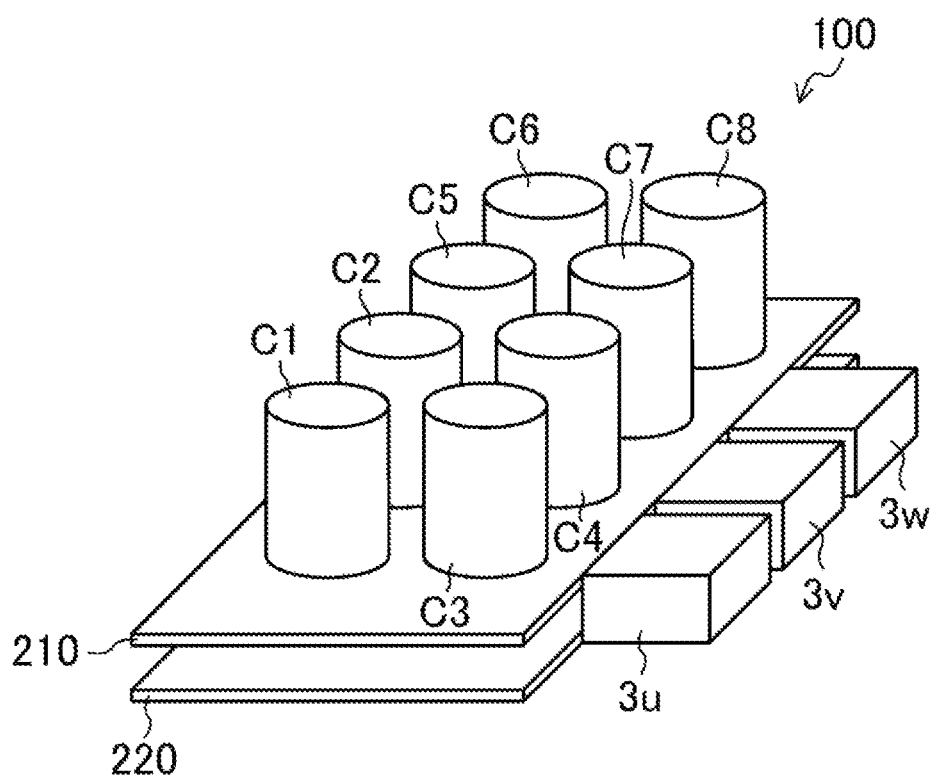
FIG. 2 is a perspective view of the power conversion apparatus.

FIG. 2 is a perspective view of the power conversion apparatus 100. The electrolytic condensers C1 to C8 are provided on a printed circuit board 210. The legs 3U, 3V, and 3W of the inverter 130 are provided in the vicinity of the electrolytic condensers C1 to C8. The electrolytic condensers C1 to C8 are coupled to corresponding ones of the legs 3U, 3V, and 3W.

On a printed circuit board 220 are typically provided other electronic circuit components of the power conversion apparatus 100. Arrangement of the printed circuit boards 210 and 220 is not limited to what is shown in the drawing. Arrangement of the printed circuit boards 210 and 220 may be appropriately changed. The positive potential conductor P, the negative potential conductor N, and the common potential conductor C are realized by, for example, conductive patterns of the printed circuit board 210. In a case in which the positive potential conductor P, the negative potential conductor N, and the common potential conductor C are realized by bus bars made of metal, higher current may flow than in the printed circuit board.

Conductor Pattern

Figure 3:
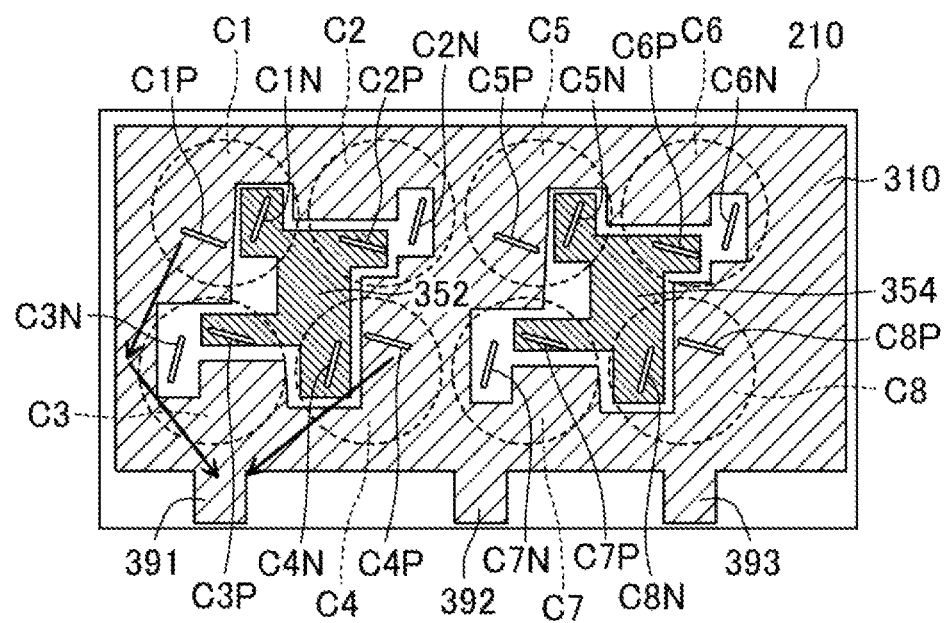
FIG. 3 is a view showing a positive potential pattern, which is a positive potential conductor P provided on a printed circuit board.

FIG. 3 is a view showing a positive potential pattern 310, which is the positive potential conductor P provided on the printed circuit board 210. The electrolytic condensers C1 to C8 are disposed as shown in FIG. 3. Each of the electrolytic condensers C1 to C8 has a positive terminal (denoted by reference symbol P) and a negative terminal (denoted by reference symbol N). For example, the electrolytic condenser C1 has a positive terminal C1P and a negative terminal C1N. In the same manner, reference symbols are applied to the other electrolytic condensers C2 to C8.

The positive potential pattern 310 interconnects the positive terminal C1P of the electrolytic condenser C1, the positive terminal C4P of the electrolytic condenser C4, the positive terminal C5P of the electrolytic condenser C5, and the positive terminal C8P of the electrolytic condenser C8. Nodes 391 to 393 are connected to anodes of the legs 3U, 3V, and 3W of the inverter 130. The positive potential pattern 310 supplies positive voltage to the inverter 130. An arrow shown in FIG. 3 indicates a path of current flowing from the positive terminals C1P and C4P to the node 391.

A common potential pattern 352 interconnects the negative terminal C1N of the electrolytic condenser C1, the positive terminal C2P of the electrolytic condenser C2, the positive terminal C3P of the electrolytic condenser C3, and the negative terminal C4N of the electrolytic condenser C4. A common potential pattern 354 interconnects the negative terminal C5N of the electrolytic condenser C5, the positive terminal C6P of the electrolytic condenser C6, the positive terminal C7P of the electrolytic condenser C7, and the negative terminal C8N of the electrolytic condenser C8.

The common potential patterns 352 and 354 have common potential of the power conversion apparatus 100. That is, the common potential patterns 352 and 354 function as the ground of the power conversion apparatus 100. Unexplained reference symbols shown in FIG. 3 will be referred to in the following description of FIG. 4.

Figure 4:
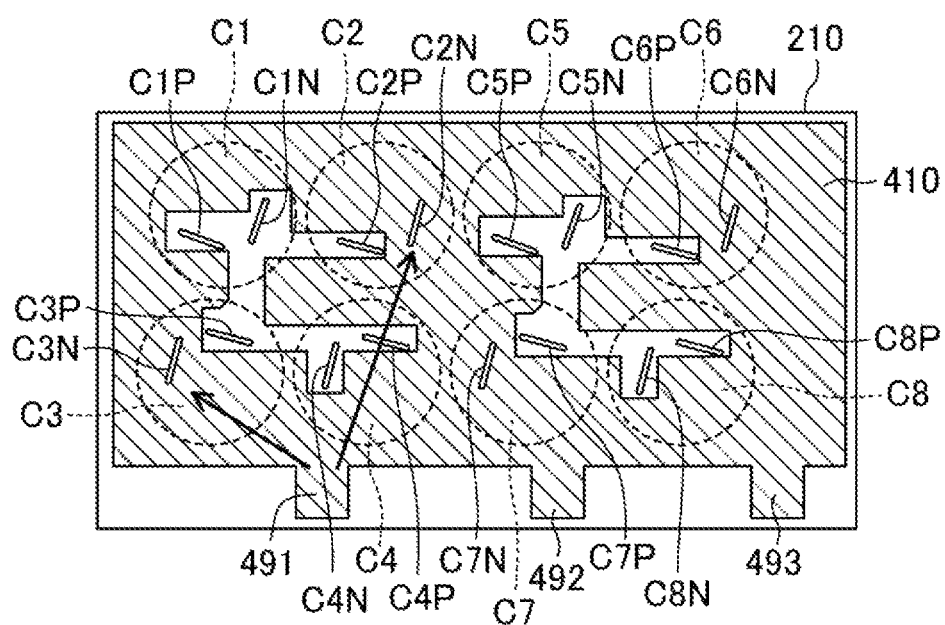
FIG. 4 is a view showing a negative potential pattern, which is a negative potential conductor N provided on the printed circuit board.

FIG. 4 is a view showing a negative potential pattern 410, which is the negative potential conductor N provided on the printed circuit board 210. The negative potential pattern 410 interconnects the negative terminal C2N of the electrolytic condenser C2, the negative terminal C3N of the electrolytic condenser C3, the negative terminal C6N of the electrolytic condenser C6, and the negative terminal C7N of the electrolytic condenser C7. Nodes 491 to 493 are connected to cathodes of the legs 3U, 3V, and 3W of the inverter 130. The negative potential pattern 410 supplies negative voltage to the inverter 130. An arrow shown in FIG. 4 indicates a path of current flowing from the node 491 to the negative terminals C2N and C3N.

The positive potential pattern 310 and the negative potential pattern 410 smooth pulsating current power received from the rectifier 110 to supply direct current power to the inverter 130. The positive potential pattern 310 and the negative potential pattern 410 may further include nodes to receive power from the rectifier 110 in addition to the nodes 391 to 393 and 491 to 493. Such nodes are located on the positive potential pattern 310 and the negative potential pattern 410 in the vicinity of sides opposite to sides at which the nodes 391 to 393 and 491 to 493 are located. These nodes may have any appropriate shapes or positions.

The printed circuit board 210 has, for example, two or more layers. Typically, the positive potential pattern 310 and the negative potential pattern 410 are provided at two of the layers of the printed circuit board 210.

In an alternative embodiment, the positive potential pattern 310 and the negative potential pattern 410 may be provided on different printed circuit boards. For example, the positive potential pattern 310 and the negative potential pattern 410 may be provided separately on the printed circuit boards 210 and 220 of FIG. 2.

Instead of using the printed circuit board 210, the positive potential pattern 310 and the negative potential pattern 410 may be realized by bus bars.

Figure 5:
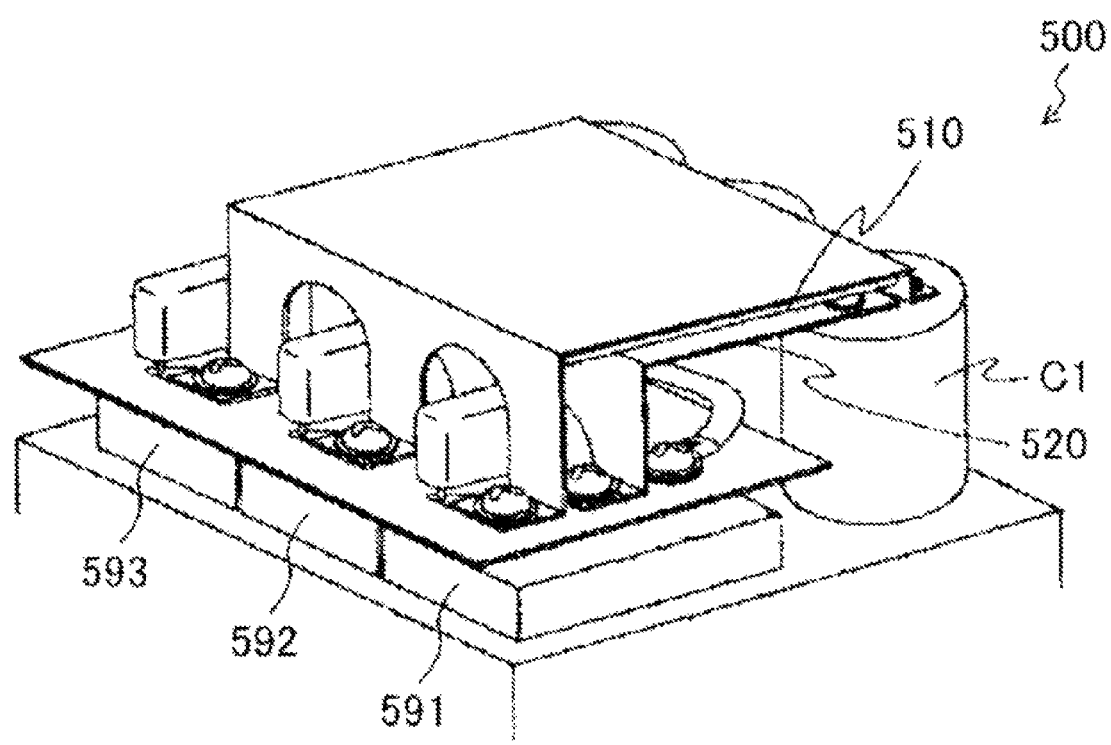
FIG. 5 is a perspective view showing a power conversion apparatus according to an alternative embodiment of the present invention.

FIG. 5 is a perspective view showing a power conversion apparatus 500 according to an alternative embodiment of the present invention. In the power conversion apparatus 500, at least two selected from among a positive potential conductor P, a negative potential conductor N, and a common potential conductor C are bus bars 510 and 520 made of metal. The bus bars 510 and 520 are connected to semiconductor switching devices 591 and 592.

Arrangement Relationships Between Condenser Terminals

Figure 6:
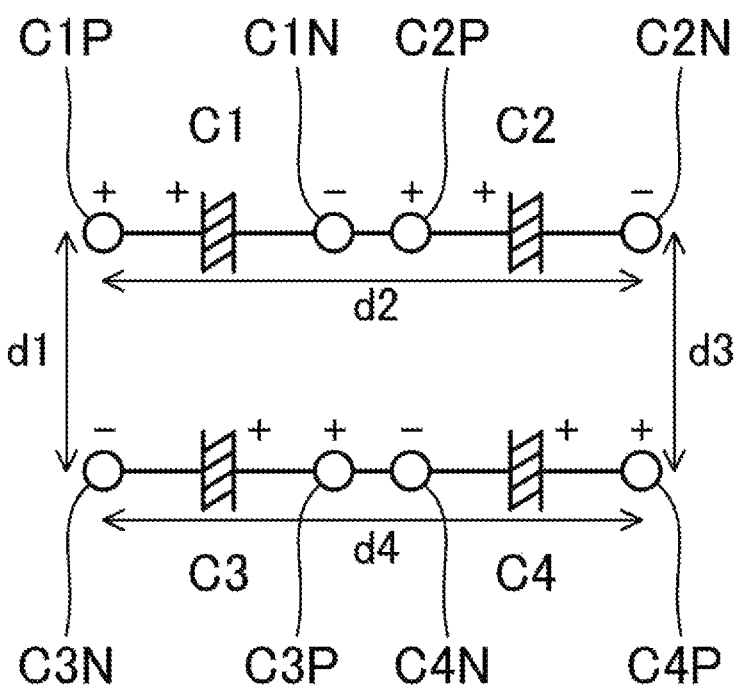
FIG. 6 is a view showing arrangement of positive terminals and negative terminals of electrolytic condensers.

FIG. 6 is a view showing arrangement of the positive terminals and the negative terminals of the electrolytic condensers C1 to C4. The electrolytic condensers C1 and C2 are connected to each other in series. The electrolytic condensers C3 and C4 are also connected to each other in series. The pair of series-connected electrolytic condensers C1 and C2 and the pair of series-connected electrolytic condensers C3 and C4 are connected to each other in parallel.

The electrolytic condensers C1 to C4 of FIG. 6 is a portion of the smoothing circuit 120 of FIG. 1. Specifically, the smoothing circuit 120 includes two sets of electrolytic condensers C1 to C4 shown in FIG. 6. In this case, the eight electrolytic condensers are connected to one another by the positive potential pattern 310 and the negative potential pattern 410.

According to various embodiments of the present invention, relationships of d1<d2 and d3<d4 (hereinafter, referred to as arrangement relationships) come into effect. d1 indicates the distance between the positive terminal C1P of the electrolytic condenser C1 and the negative terminal C3N of the electrolytic condenser C3. d2 indicates the distance between the positive terminal C1P of the electrolytic condenser C1 and the negative terminal C2N of the electrolytic condenser C2. d3 indicates the distance between the positive terminal C4P of the electrolytic condenser C4 and the negative terminal C2N of the electrolytic condenser C2. d4 indicates the distance between the positive terminal C4P of the electrolytic condenser C4 and the negative terminal C3N of the electrolytic condenser C3. In other words, in arrangement relationships according to various embodiments of the present invention, a segment interconnecting the positive terminal C1P of the electrolytic condenser C1 and the positive terminal C4P of the electrolytic condenser C4 intersects a segment interconnecting the negative terminal C2N of the electrolytic condenser C2 and the negative terminal C3N of the electrolytic condenser C3.

The positive potential pattern 310 of FIG. 3 and the negative potential pattern 410 of FIG. 4 include two sets of electrolytic condensers C1 to C4 shown in FIG. 6. However, embodiments of the present invention are not limited thereto. For example, the positive potential pattern 310 and the negative potential pattern 410 may include any appropriate number of electrolytic condenser groups. In an alternative embodiment, a single electrolytic condenser may be used instead of the series-connected electrolytic condensers C1 and C2 and a single electrolytic condenser may be used instead of the series-connected electrolytic condensers C3 and C4.

In various embodiments of the present invention, the above arrangement relationships are satisfied. As shown in FIGS. 3 and 4, current flows in the electrolytic condensers C1 to C4 in opposite directions. As a result, inductance of the smoothing circuit 120 may be reduced by mutual inductance, which will hereinafter be described. Furthermore, in a case in which the positive potential conductor P, the negative potential conductor N, and the common potential conductor C are realized by the same printed circuit board 210, a current flow channel is formed in a closer fashion, thereby further reducing inductance.

Figure 7:
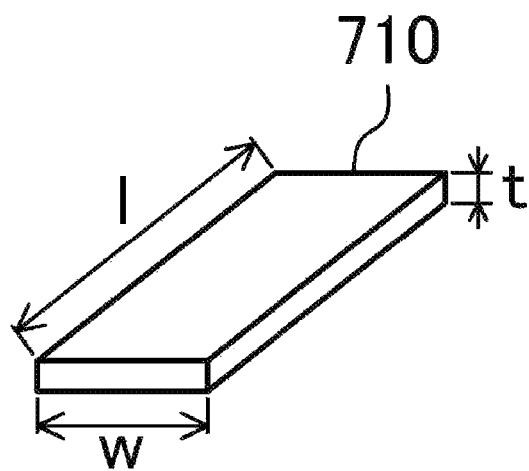
FIG. 7 is a view showing a conductor provided on a printed circuit board.

FIG. 7 is a view showing a conductor 710 provided on a printed circuit board. The conductor 710 has a length l, width w, and thickness t. At this time, the conductor 710 has inductance $L=\mu_0 l/2\pi[\ln(2l/w+t)+1/2+0.2235(w+t)/l]$, where $\mu_0$ indicates vacuum permeability, $\pi$ indicates a ratio of the circumference of a circle to its diameter, and ln indicates a natural logarithm.

Figure 8:
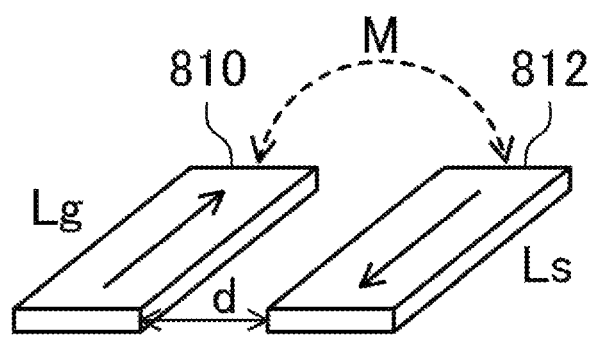
FIG. 8 is a view showing conductors provided on a printed circuit board.

FIG. 8 is a view showing conductors 810 and 812 provided on a printed circuit board. The conductors 810 and 812 have a length l, width w, and thickness t. The conductors 810 and 812 are spaced from each other by a distance d. At this time, on the assumption that the conductor 810 has an inductance Lg, the conductor 812 has an inductance Ls, and mutual inductance of the conductors 810 and 812 is M, the conductors 810 and 812 have synthesized inductance L=Lg+Ls−2M. The conductors 810 and 812 have mutual inductance $M=\mu_0 l/2\pi[\ln(2l/d)-1+d/l]$.

Reduction of Inductance

Figure 9:
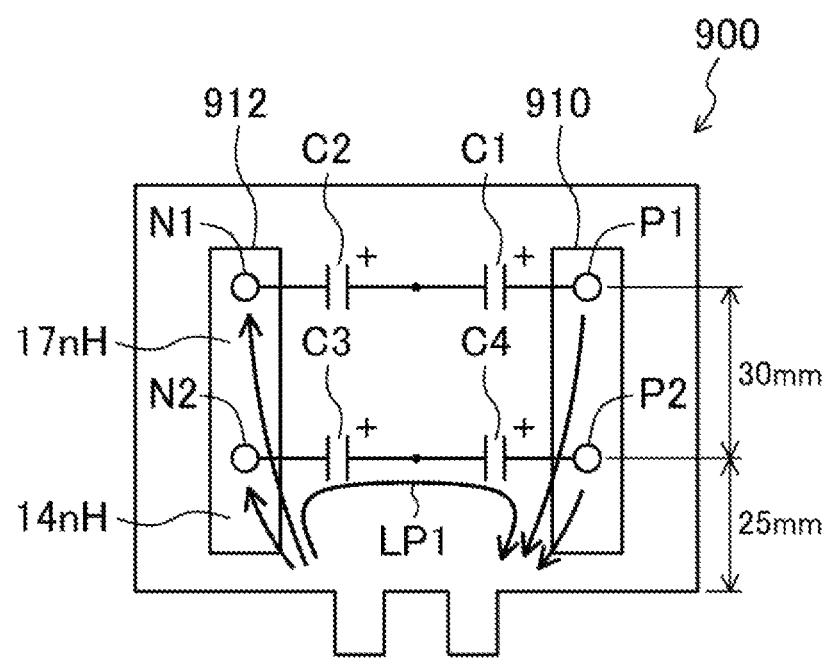
FIG. 9 is a view showing a conventional smoothing circuit.

FIG. 9 is a view showing a conventional smoothing circuit 900. In the smoothing circuit 900, series-connected electrolytic condensers C1 and C2 and series-connected electrolytic condensers C3 and C4 are connected to each other in parallel. A pattern 910 interconnects a positive terminal P1 of the electrolytic condenser C1 and a positive terminal P2 of the electrolytic condenser C4. A pattern 912 interconnects a negative terminal N1 of the electrolytic condenser C2 and a negative terminal N2 of the electrolytic condenser C3.

Specifically, in the smoothing circuit 900, the distance between the positive terminal P1 of the electrolytic condenser C1 and the negative terminal N2 of the electrolytic condenser C3 is longer than the distance between the positive terminal P1 of the electrolytic condenser C1 and the positive terminal P2 of the electrolytic condenser C4. Furthermore, in the smoothing circuit 900, the distance between the negative terminal N1 of the electrolytic condenser C2 and the positive terminal P2 of the electrolytic condenser C4 is longer than the distance between the negative terminal N1 of the electrolytic condenser C2 and the negative terminal N2 of the electrolytic condenser C3.

The patterns 910 and 912 have a thickness of 0.018 mm and a pattern width of 5 mm. A loop LP1 has an inductance of 14 nH+14 nH=28 nH.

Figure 10:
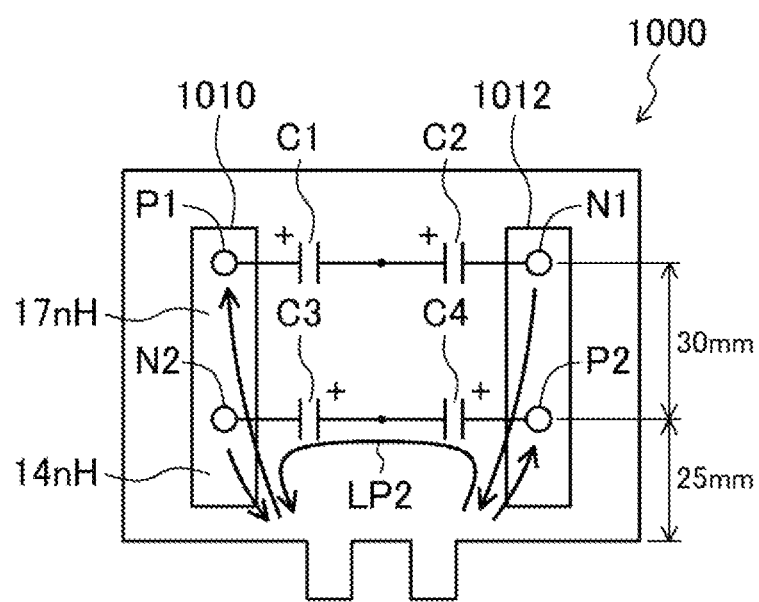
FIG. 10 is a view showing a smoothing circuit according to an embodiment of the present invention.

FIG. 10 is a view showing a smoothing circuit 1000 according to an embodiment of the present invention. In the smoothing circuit 1000, series-connected electrolytic condensers C1 and C2 and series-connected electrolytic condensers C3 and C4 are connected to each other in parallel. A pattern 1010 interconnects a positive terminal P1 of the electrolytic condenser C1 and a negative terminal N2 of the electrolytic condenser C3. A pattern 1012 interconnects a negative terminal N1 of the electrolytic condenser C2 and a positive terminal P2 of the electrolytic condenser C4.

Specifically, in the smoothing circuit 1000, the distance between the positive terminal P1 of the electrolytic condenser C1 and the negative terminal N2 of the electrolytic condenser C3 is shorter than the distance between the positive terminal P1 of the electrolytic condenser C1 and the positive terminal P2 of the electrolytic condenser C4. Furthermore, in the smoothing circuit 1000, the distance between the negative terminal N1 of the electrolytic condenser C2 and the positive terminal P2 of the electrolytic condenser C4 is shorter than the distance between the negative terminal N1 of the electrolytic condenser C2 and the negative terminal N2 of the electrolytic condenser C3.

The patterns 1010 and 1012 have a thickness of 0.018 mm and a pattern width of 5 mm. A loop LP2 has an inductance of 14 nH+14 nH−12 nH=16 nH. Consequently, the inductance of the loop LP2 of the smoothing circuit 1000 is less than the inductance of the conventional loop LP1.

Figure 11:
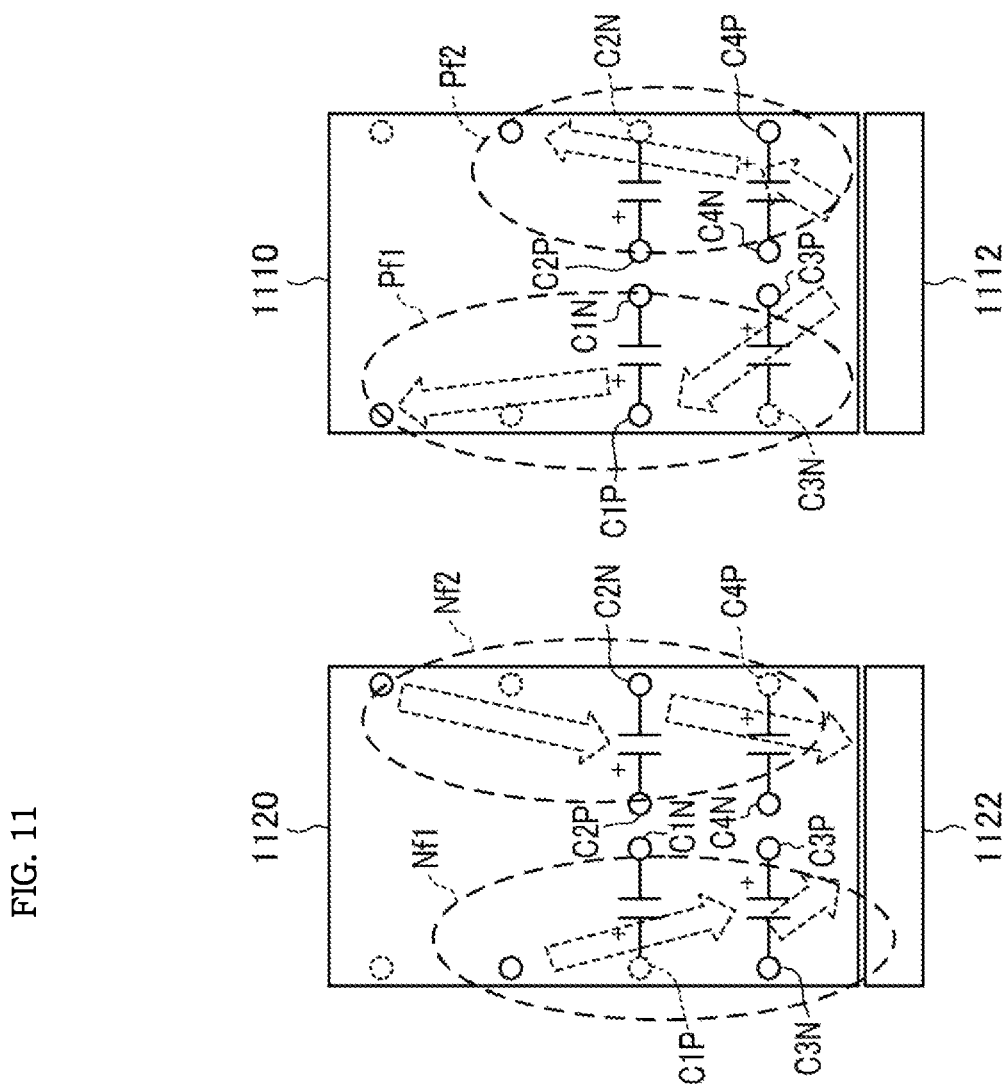
FIG. 11 is a schematic view showing a positive potential conductor and a negative potential conductor of the smoothing circuit.

FIG. 11 is a schematic view showing a positive potential conductor 1110 and a negative potential conductor 1120 of the smoothing circuit 120. An anode and a cathode of the inverter 130 are located in regions 1112 and 1122, respectively. The conductors 1110 and 1120 have two sets of positive potential patterns shown in FIG. 3 and negative potential patterns shown in FIG. 4.

The positive potential conductor 1110 and the negative potential conductor 1120 of the smoothing circuit 120 correspond to, for example, the positive potential pattern 310 and the negative potential pattern 410, respectively. Consequently, the positive potential conductor 1110 and the negative potential conductor 1120 are provided at two of the layers of the printed circuit board 210. Instead of using the printed circuit board 210, the positive potential conductor 1110 and the negative potential conductor 1120 may be realized by bus bars as shown in FIG. 5.

At the positive potential conductor 1110, currents Pf1 and Pf2 flow in the electrolytic condensers. At the negative potential conductor 1120, currents Nf1 and Nf2 flow in the electrolytic condensers. According to various embodiments of the present invention, the currents Pf1 and Nf1 are offset and the currents Pf2 and Nf2 are offset. In other words, the currents Pf1 and Nf1 flowing in the adjacent patterns (or bus bars) flow in opposite directions and the currents Pf2 and Nf2 flowing in the adjacent patterns (or bus bars) flow in opposite directions. As shown in FIG. 10, mutual inductance may be reduced.

The power conversion apparatus 100 may further include one or more additional components in addition to the rectifier 110, the smoothing circuit 120, and the inverter 130. On the other hand, one or more selected from among the rectifier 110, the smoothing circuit 120, and the inverter 130 may be omitted from the power conversion apparatus 100. Various functions of the power conversion apparatus 100 may not be blocked as the rectifier 110, the smoothing circuit 120, and the inverter 130. For example, the functions of the power conversion apparatus 100 may be blocked using any appropriate method.

The positive potential conductor, the negative potential conductor, and the common potential conductor used in various embodiments of the present invention may be formed of any appropriate material, such as copper, brass, iron, and stainless steel. The positive potential conductor, the negative potential conductor, and the common potential conductor may have any appropriate pattern shape and thickness as long as the positive potential conductor, the negative potential conductor, and the common potential conductor satisfy the above-defined arrangement relationships.

It would be appreciated by those skilled in the art that one or more of the above-described various components (for example, hardware components) may be omitted. On the other hand, one or more additional components may be added.

As is apparent from the above description, embodiments of the present invention provide a power conversion apparatus with further reduced inductance of conductors coupling condensers.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A power conversion apparatus, comprising:
a smoothing circuit having first and second electrolytic condensers connected to each other in series and third and fourth electrolytic condensers connected to each other in series, wherein
the first and second electrolytic condensers and the third and fourth electrolytic condensers are arranged in an array of electrolytic condensers comprising n rows and m columns of electrolytic condensers,
the first electrolytic condenser is arranged in a same row as the second electrolytic condenser among the n rows of the array and a same column as the third electrolytic condenser among the m columns of the array,
a positive terminal of the first electrolytic condenser and a positive terminal of the fourth electrolytic condenser are connected to a positive potential conductor,
a negative terminal of the second electrolytic condenser and a negative terminal of the third electrolytic condenser are connected to a negative potential conductor,
a negative terminal of the first electrolytic condenser and a positive terminal of the second electrolytic condenser are connected to a common potential conductor, a positive terminal of the third electrolytic condenser and a negative terminal of the fourth electrolytic condenser are connected to the common potential conductor,
a distance between the positive terminal of the first electrolytic condenser and the negative terminal of the third electrolytic condenser is shorter than a distance between the positive terminal of the first electrolytic condenser and the negative terminal of the second electrolytic condenser, and
a distance between the positive terminal of the fourth electrolytic condenser and the negative terminal of the second electrolytic condenser is shorter than a distance between the positive terminal of the fourth electrolytic condenser and the negative terminal of the third electrolytic condenser.

2. The power conversion apparatus according to claim 1, wherein the positive potential conductor, the negative potential conductor, and the common potential conductor are disposed on at least one printed circuit board.

3. The power conversion apparatus according to claim 2, further comprising at least one rectifier and an inverter.

4. The power conversion apparatus according to claim 3, further comprising three sets of rectifiers to convert three-phase power.

5. The power conversion apparatus according to claim 3, further comprising three sets of inverters for three-phase power.

6. The power conversion apparatus according to claim 1, wherein the common potential conductor is grounded.

7. A power conversion apparatus, comprising:
a smoothing circuit comprising at least two smoothing sub-circuits, each smoothing sub-circuit of the at least two smoothing sub-circuits being connected in parallel to each other through a positive potential conductor, a ground potential conductor, and a negative potential conductor,
wherein each smoothing sub-circuit comprises:
a first condenser connected to the positive potential conductor and the ground potential conductor;
a second condenser connected to the ground potential conductor and the negative potential conductor;
a third condenser connected to the ground potential conductor and the negative potential conductor; and a fourth condenser connected to the positive potential conductor and the ground potential conductor;

wherein the first through fourth condensers are arranged in an array of condensers comprising n rows and m columns of condensers, the first condenser is arranged in a same row as the second condenser among the n rows of the array and a same column as the third condenser among the m columns of the array, wherein a first distance (d1) between a connection of the first condenser to the positive potential conductor and a connection of the third condenser to the negative potential conductor is shorter than a second distance (d2) between the connection of the first condenser to the positive potential conductor and a connection of the second condenser to the negative potential conductor; and wherein a third distance (d3) between the connection of a fourth condenser to the positive potential conductor and the connection of the second condenser to the negative potential conductor is shorter than a fourth distance (d4) between the connection of the fourth condenser to the positive potential conductor and the connection of the third condenser to the negative potential conductor.

* * * * *